(12) United States Patent  (10) Patent No.: US 8,348,420 B2
Li  (45) Date of Patent: Jan. 8, 2013

(54) EYEGLASS WITH A SOFT SLEEVING ELEMENT

(75) Inventor: Hsing-Chen Li, Tainan (TW)

(73) Assignee: High Rainbow Enterprise Co., Ltd., Tainan (TW)

( * ) Notice: Subject to any disclaimer, the term of this patent is extended or adjusted under 35 U.S.C. 154(b) by 151 days.

(21) Appl. No.: 12/952,600

(22) Filed: Nov. 23, 2010

(65) Prior Publication Data

US 2012/0127421 A1    May 24, 2012

(51) Int. Cl.
    *G02C 7/10* (2006.01)
(52) U.S. Cl. .............................. 351/44; 351/62; 351/86
(58) Field of Classification Search .............. 351/41, 351/43, 44, 62, 83, 86–88, 154; 2/12, 13, 2/15, 426–429, 448–450, 435–437
    See application file for complete search history.

(56) References Cited

U.S. PATENT DOCUMENTS 7,543,929 B2 * 6/2009 Yang .............................. 351/62
2011/0219523 A1 * 9/2011 Chiang ........................... 2/434

* cited by examiner

*Primary Examiner* — Huy K Mai
(74) *Attorney, Agent, or Firm* — Wang Law Firm, Inc.; Li K. Wang; Stephen Hsu

(57) ABSTRACT

The present invention provides an eyeglass frame/one-piece lens with a soft sleeving element. The soft sleeving element is provided with an elongated groove disposed inner the upper portion, and at least an inlaid flange is disposed in the elongated groove so as to form at least two spaced sections. At least a through hole and at least a curved slot are disposed in each side of the soft sleeving element, and a distal end is disposed at the bottom of each curved slot. The eyeglass frame/one-piece lens is provided with at least a pair of protrudent extensions at each side, at least a lower catching hollow is disposed at the bottom of each lower protrudent extension, and a catching concavity is formed on the upper rim of the eyeglass frame/one-piece lens. Each pair of protrudent extensions are inserted through the through hole and the curved slot, each distal end is caught and firmly secured in each lower catching hollow, and the inlaid flange is caught in the catching concavity.

11 Claims, 3 Drawing Sheets

EYEGLASS WITH A SOFT SLEEVING ELEMENT

BACKGROUND OF THE INVENTION

1. Field of the Invention

The present invention is related to an eyeglass frame/one-piece lens, with innovatory convenience and comfort features, and more particularly to an eyeglass frame/one-piece lens provided with a soft sleeving element to be coupled to the rim of the eyeglass frame/one-piece lens so as for the eyeglasses to be worn comfortably.

2. Description of the Related Art

Eyeglasses have become an indispensable device in the daily life of modern people. Eyeglasses for myopia, presbyopia and vision correction emphasize practicality, eyeglasses for industry use, sunglasses and windproof eyeglasses emphasize functionality, and stylized eyeglasses emphasize aesthetic appearance and fashion.

In addition to the practicality, functionality or aesthetic appearance, a pair of eyeglasses must be worn comfortably. A most common style of eyeglasses in the current market is a pair of eyeglasses with an eyeglass frame to support a pair of lenses (framed eyeglasses) or with only a pair of lenses or a one-piece lens (frameless eyeglasses). Generally, an eyeglass frame may be made of mental or plastic material. No matter what material an eyeglass frame is made of, a wearer will still feel uncomfortable while a pair of eyeglasses, framed or frameless, being worn closely to the wearer's face.

BRIEF SUMMARY OF THE INVENTION

Therefore, in order to solve the above-mentioned problems, the present invention is to provide an eyeglass frame/one-piece lens with a soft sleeving element that substantially obviates the drawbacks of the related conventional art.

A primary objective of the present invention is to Provide an eyeglass frame/one-piece lens with a soft sleeving element, in which the soft sleeving element is coupled to the rim of the eyeglass frame/one-piece lens with a simpler method for saving time and manpower cost spent in assembly and disassembly.

Another primary objective of the present invention is to provide an eyeglass frame/one-piece lens with a soft sleeving element, whose soft sleeving element is made of soft material so as for a wearer to feel comfortable when the soft sleeving element being in contact with a wearer's face.

Still another primary objective of the present invention is to provide an eyeglass frame/one-piece lens with a soft sleeving element, whose soft sleeving element is provided with a plurality of ventilating holes for ventilation, and whose ventilating holes are disposed below the rim of the eyeglass frame/one-piece lens after the soft sleeving element being coupled to the rim of the eyeglass frame/one-piece lens in order to prevent liquid from directly splashing through the ventilating holes into the eyes of a wearer.

According to above objectives, the present invention provides an eyeglass frame/one-piece lens with a soft sleeving element. The soft sleeving element is provided with an elongated groove disposed inner the upper portion, and at least an inlaid flange is disposed in the elongated groove so as to form at least two spaced sections. At least a through hole and at least a curved slot are disposed in each side of the soft sleeving element, and a distal end is disposed at the bottom of each curved slot. The eyeglass frame/one-piece lens is provided with at least a pair of corresponding protrudent extensions at each side, at least an ornamental block is disposed at the bottom of each lower protrudent extension, at least a lower catching hollow is disposed adjacent to each ornamental block, and a catching concavity is formed on the upper rim of the eyeglass frame/one-piece lens. While being assembled, each pair of protrudent extensions are respectively inserted through the through hole and the curved slot, each distal end is caught and firmly secured in each dovetail-shaped lower catching hollow, and the inlaid flange is caught in the catching concavity.

BRIEF DESCRIPTION OF THE DRAWINGS

The invention as well as a preferred mode of use, further features and advantages thereof will best be understood by reference to the following detailed description of the illustrative embodiments when read in conjunction with the accompanying drawings, wherein.

DETAILED DESCRIPTION OF THE PREFERRED EMBODIMENT

The present invention discloses an eyeglass frame/one-piece lens with a soft sleeving element, and some detailed parts of process for manufacturing or processing eyeglasses are accomplished by applying prior art. Therefore, these parts will not be completely depicted in the description below. The drawings referred in the following are not made according to the actual related sizes, and the function of these drawings is only for illustrating characteristics related to the present invention.

Figure 1:
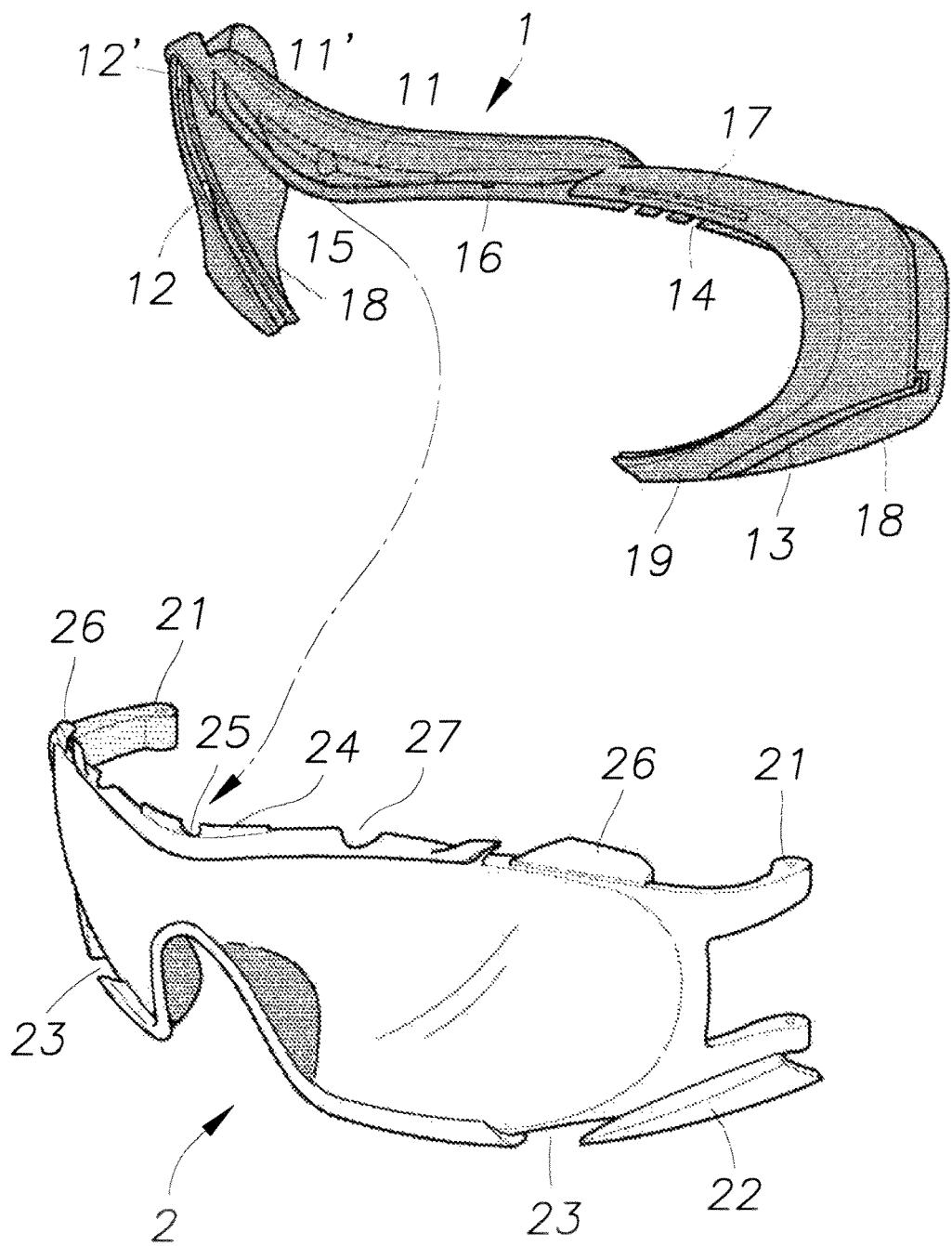
FIG. 1 is a perspective exploded view of a preferred embodiment of the eyeglass frame/one-piece lens and the soft sleeving element in accordance with the present invention.

FIG. 1 is a perspective exploded view of a preferred embodiment of the eyeglass frame/one-piece lens 2 with a soft sleeving element 1 according to the present invention. The present invention is assembled by a soft sleeving element 1 and an eyeglass frame/one-piece lens 2. The soft sleeving element 1 is integrally made of flexible material, such as PVC, TPU, TPE, TPR, etc. The soft sleeving element 1 is provided with an elongated groove disposed inner the upper portion, and at least an inlaid flange 15 is disposed in the elongated groove so as to form at least two spaced sections 11, 11'. At least a through hole 12' and at least a curved slot 12 are disposed in each side of the soft sleeving element 1, and a curved flange 13 is disposed at the bottom of each curved slot 12. At least a coupled flange 16 and a slot 17 are respectively disposed in each of spaced sections 11, 11' of the elongated groove, and at least a ventilating hole 14 is disposed below each slot 17. At least a wing piece 18 is disposed at each inner side of the soft sleeving element 1, and a distal end 19 is formed at the bottom of each wing piece 18. The eyeglass frame/one-piece lens 2 is integrally made, at least a pair of corresponding protrudent extensions 21 are disposed at each side of the eyeglass frame/one-piece lens 2, at least an ornamental block 22 is disposed at the bottom of each lower protrudent extension 21, and at least a lower catching hollow 23 is disposed adjacent to each ornamental block 22. At least a pair of inlaid pieces 24 are disposed on the upper rim of the eyeglass frame/one-piece lens 2, and a catching concavity 25 is formed between the pair of inlaid pieces 24. At least a pair of inserting blocks 26 and a pair of notches 27 are disposed on the upper rim of the eyeglass frame/one-piece lens 2.

Figure 2:
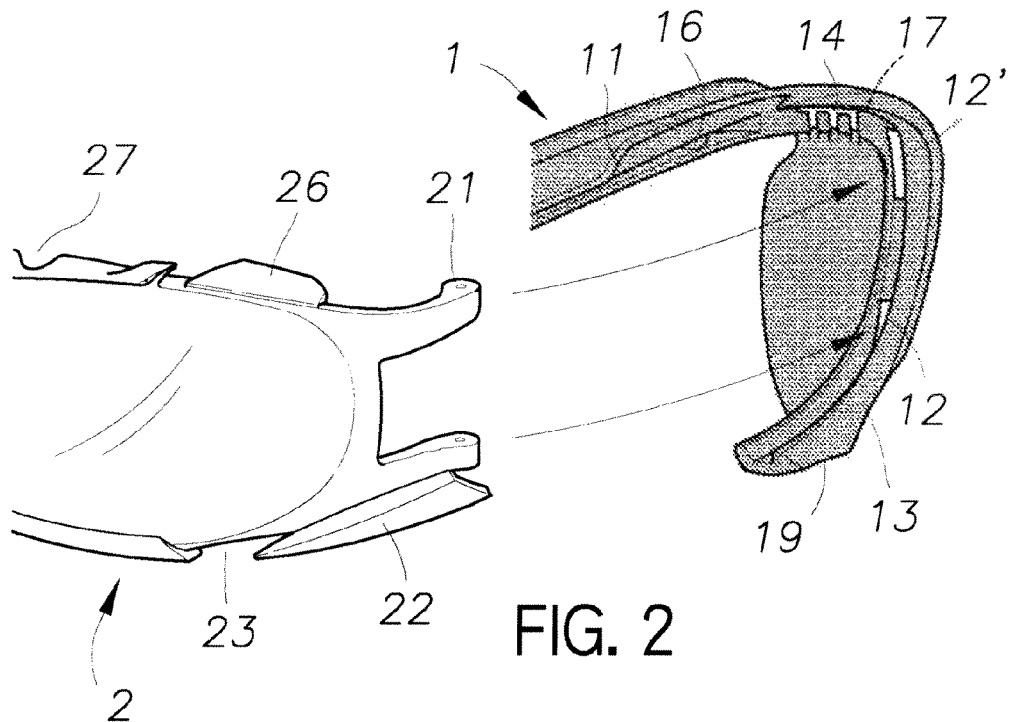
FIG. 2 is a schematic view of two protrudent extensions disposed at one end of the eyeglass frame/one-piece lens being respectively penetrated through two through holes in one side of the soft sleeving element in accordance with the present invention.
Figure 3:
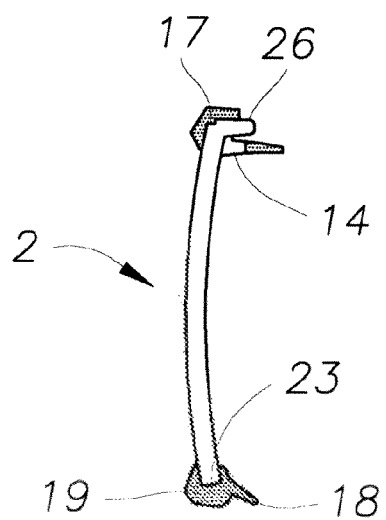
FIG. 3 is a cross sectional view of an end portion of the soft sleeving element being caught in a lower catching hollow of the eyeglass frame/one-piece lens while an inlaid block of the eyeglass frame/one-piece lens being inlaid in a slot of the soft sleeving element in accordance with the present invention.
Figure 4:
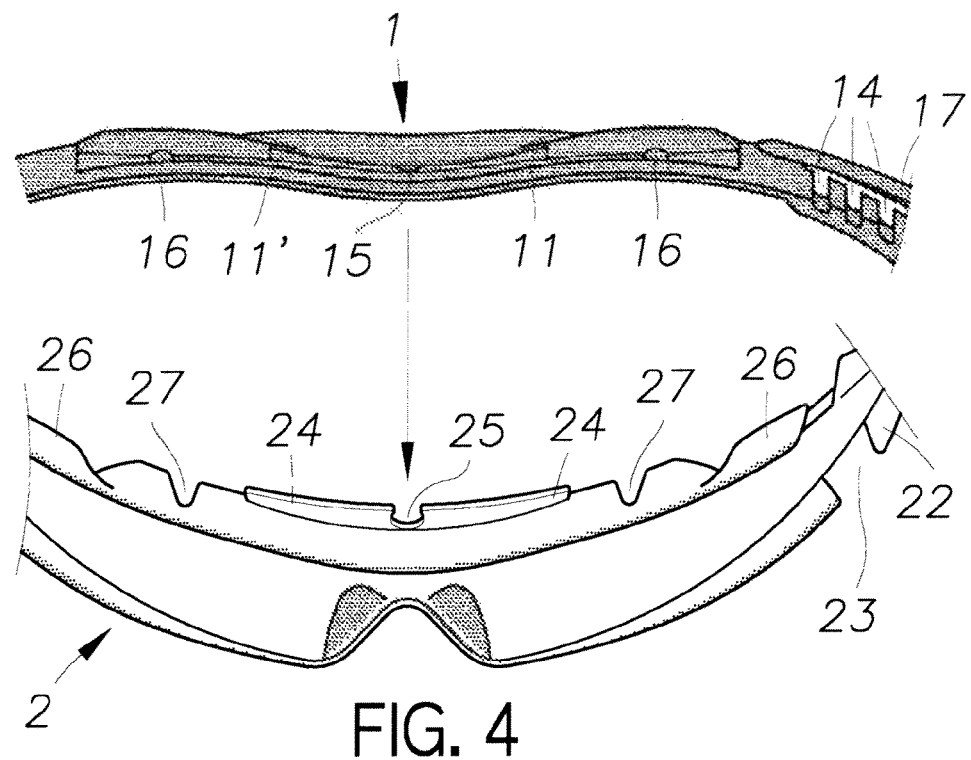
FIG. 4 is a schematic view of the elongated groove of the soft sleeving element being coupled to the upper rim of the eyeglass frame/one-piece lens in accordance with the present invention; and, FIG. 5 is a perspective view of a preferred embodiment of the eyeglass frame/one-piece lens and the soft sleeving element in an assembled configuration in accordance with the present invention.
Figure 5:
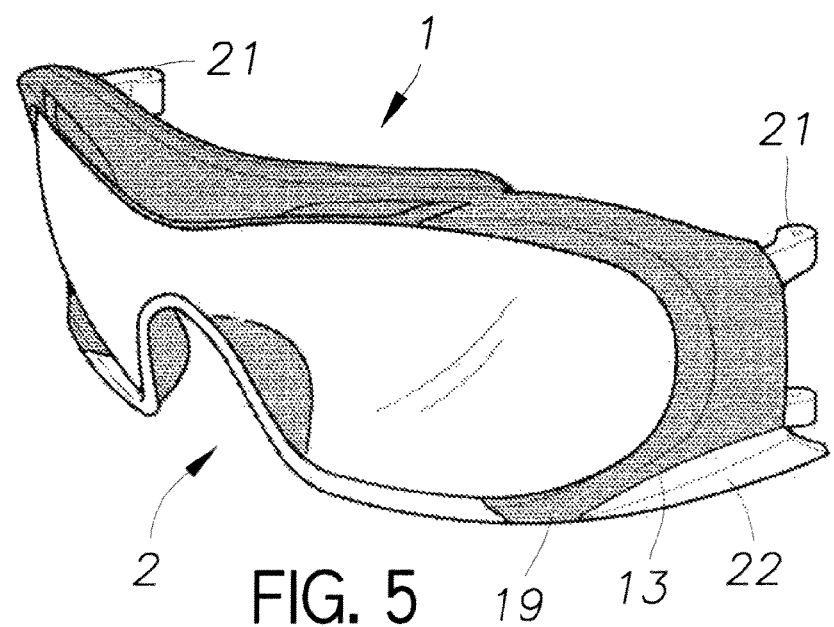

While being assembled, referring to FIG. 2, each pair of protrudent extensions 21 at each side of the eyeglass frame/one-piece lens 2 are respectively inserted through the through hole 12' and the curved slot 12 in each side of the soft sleeving element 1, each ornamental block 22 at the bottom of the eyeglass frame/one-piece lens 2 is penetrated outward each curved slot 12 to be secured against each curved flange 13 at the bottom of each curved slot 12, and each distal end 19 is accordingly caught and firmly secured in each dovetail-shaped lower catching hollow 23 at the bottom of the eyeglass frame/one-piece lens 2. Referring to FIGS. 3, 4, and 5, the inlaid flange 15 of the soft sleeving element 1 is caught in the catching concavity 25 of the eyeglass frame/one-piece lens 2, the pair of inlaid pieces 24 of the eyeglass frame/one-piece lens 2 are accordingly inlaid in the spaced sections 11, 11' of the elongated groove, each coupled flange 16 is received in each notch 27, and then each inserting block 26 of the eyeglass frame/one-piece lens 2 is inlaid in each slot 17 of the soft sleeving element 1 with each ventilating hole 14 being against the bottom surface of each inserting block 26.

While the pair of eyeglasses in accordance with the present invention being worn, a wearer will feel comfortable because of the flexibility of the soft sleeving element 1 as well as the wing pieces 18. The ventilating holes 14 can provide good ventilation, and they are disposed below the bottom surface of the inserting blocks 26 so as to prevent liquid from directly splashing into the eyes of a wearer.

While the present invention has been described above by way of examples and in terms of the preferred embodiment, it is to be recognized and understood that the present invention is not limited to the disclosed embodiment, it is intended to cover various modifications and similar arrangements as may be made thereto, and the scope of the appended claims should be accorded the broadest interpretation so as to encompass all such modifications which may fall within the spirit and the invention.

What is claimed is:

1. An eyeglass with a soft sleeving element, comprising:
a soft sleeving element, said soft sleeving element being provided with at least an elongated groove disposed inner an upper portion, at least an inlaid flange being disposed in said elongated groove, at least a curved slot including a pair of through holes being disposed in each side of said soft sleeving element, and a distal end being disposed at the bottom of each side of said soft sleeving element; and,
an eyeglass frame with one-piece lens, said eyeglass frame with one-piece lens being provided with at least a pair of protrudent extensions at each side, at least an ornamental block being disposed at the bottom of the lower one of each said pair of protrudent extensions, at least a lower catching hollow being disposed adjacent to each said ornamental block, and a catching concavity being formed on an upper rim of said eyeglass frame;
wherein each said pair of protrudent extensions being inserted through said pair of through holes and said curved slot, each said ornamental block being penetrated outward said curved slot, each said distal end being accordingly caught and firmly secured in each said lower catching hollow, and said inlaid flange being caught in said catching concavity so as for said soft sleeving element to be firmly coupled to said eyeglass frame with one-piece lens.

2. The eyeglass with a soft sleeving element according to claim 1, wherein at least a curved flange is disposed at the bottom of each side of said soft sleeving element.

3. The eyeglass with a soft sleeving element according to claim 1, wherein said soft sleeving element is integrally made of flexible material.

4. The eyeglass with a soft sleeving element according to claim 1, wherein at least a ventilating hole is disposed in said soft sleeving element.

5. The eyeglass with a soft sleeving element according to claim 1, wherein at least a coupled flange is disposed in said elongated groove of said soft sleeving element.

6. The eyeglass with a soft sleeving element according to claim 1, wherein at least a slot is disposed in said elongated groove of said soft sleeving element.

7. The eyeglass with a soft sleeving element according to claim 1, wherein at least a wing piece is disposed at each inner side of said soft sleeving element.

8. The eyeglass with a soft sleeving element according to claim 1, wherein at least a pair of inlaid pieces are disposed on the upper rim of said eyeglass frame.

9. The eyeglass with a soft sleeving element according to claim 1, wherein at least a pair of inserting blocks are disposed on the upper rim of said eyeglass frame.

10. The eyeglass with a soft sleeving element according to claim 1, wherein at least a pair of notches are disposed on the upper rim of said eyeglass frame.

11. The eyeglass with a soft sleeving element according to claim 1, wherein each said distal end is caught and firmly secured in each said lower catching hollow at the bottom of said eyeglass to form a dovetail-shaped couple.

* * * * *